United States Patent [19]
Umezaki et al.

[11] 4,083,247
[45] Apr. 11, 1978

[54] APPARATUS FOR REDUCING NOISE OF A CARRIER ROLLER

[75] Inventors: Hajime Umezaki, Machida; Kyoichi Oguri, Kawasaki; Hiroshi Nakajima, Sagamihara; Shinichi Amemiya, Sagamihara; Yoshitomo Nozawa, Sagamihara, all of Japan

[73] Assignee: Caterpillar Mitsubishi Ltd., Tokyo, Japan

[21] Appl. No.: 729,544

[22] Filed: Oct. 4, 1976

[30] Foreign Application Priority Data
Oct. 11, 1975 Japan .................................. 50-151733

[51] Int. Cl.² .................... F16H 55/30; F16H 55/14; F16H 55/36
[52] U.S. Cl. .................................. 74/243 R; 74/230.3; 74/443
[58] Field of Search ............... 74/443, 243 R, 243 PC, 74/230.3, 230.7, 230.01

[56] References Cited
U.S. PATENT DOCUMENTS

| | | |
|---|---|---|
| 3,958,837 | 5/1976 | Chagawa .......................... 74/443 X |
| 3,996,810 | 12/1976 | Groff .................................. 74/230.3 |

*Primary Examiner*—Leonard H. Gerin
*Attorney, Agent, or Firm*—John W. Grant

[57] ABSTRACT

A noise reduction apparatus for a carrier roller in a crawler tractor, which includes first and second dimpled, annular guard members, each having a steel plate with a noise-absorbing member bonded thereto, and a third annular guard member having a noise-absorbing member and a layer of vibration damping material. The first and second guard members are removably secured to the opposite side faces of the carrier roller, while the third guard member is closely fitted, through the medium of the layer of the aforesaid vibration damping material, into an annular groove defined about the periphery of the central portion of the carrier roller. The noise-absorbing members of the first and second guard members are positioned on the respective inner surfaces of the steel plates.

5 Claims, 2 Drawing Figures

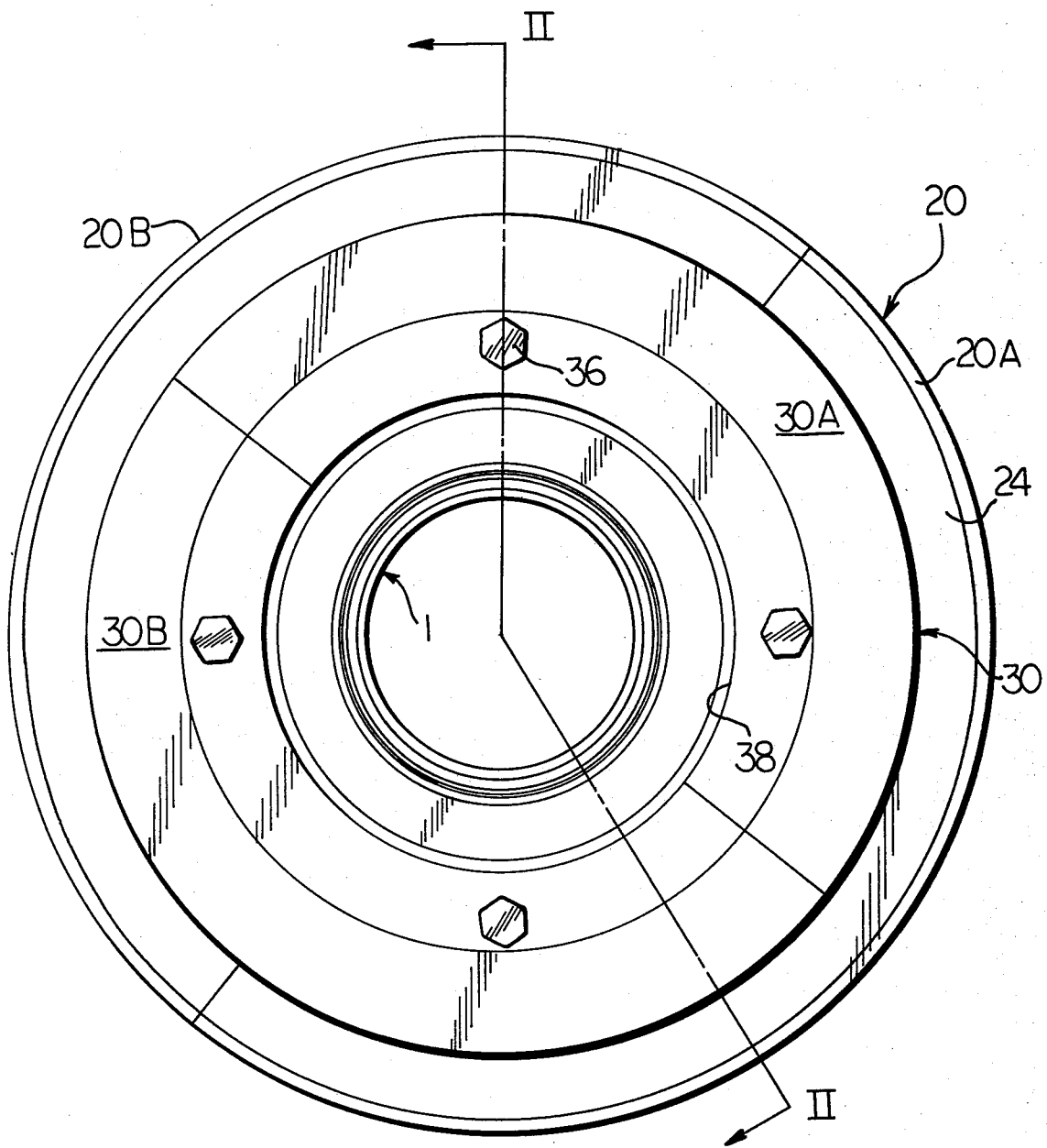

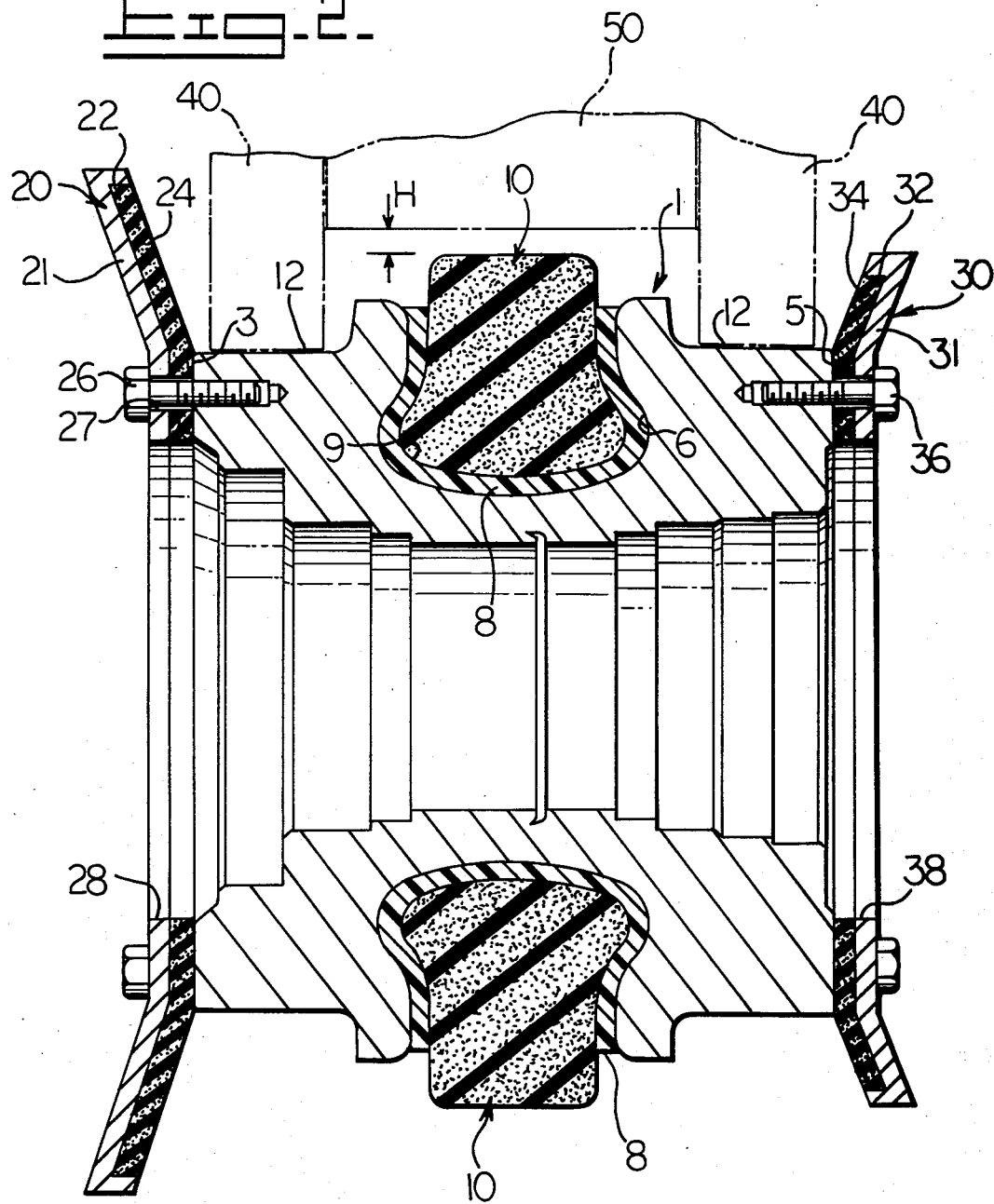

APPARATUS FOR REDUCING NOISE OF A CARRIER ROLLER

BACKGROUND OF THE INVENTION

1. Field of the Invention:

This invention relates to a noise reduction means for use in a crawler tractor, and more particularly to a noise reduction means for use with a carrier roller in a crawler tractor for absorbing and shielding noise produced when a track link hits on the carrier roller.

2. Description of the Prior Art:

As is well known, track-type tractors and loaders produce metallic sounds of a considerably high level due to the hitting of the carrier roller by the track links of a track chain during operation. These sounds at the present time provide one of major noise sources which pose a public nuisance problem.

Heretofore, there have been proposed many attempts to avoid noises emanating from carrier rollers. For instance, one attempt in which a resilient material is directly bonded to the engaging surface of a carrier roller with a track link and one in which a resilient material or a cushion material is attached to the undersurface of the aforesaid engaging surface of a carrier roller by means of bolts and nuts.

The former attempt reduces noises to a large extent because the track link contacts a resilient material, providing a metal-to-resilient contact relation. Unfortunately, excessive wear of the resilient material or cushion material results due to a high load placed thereon by the track chain as well as a friction heat produced between the track chain and carrier roller.

In contrast thereto, the latter attempt provides a metal-to-metal contact relation and noises emanating from a carrier roller may be reduced to some extent. However, this attempt increases the manufacturing cost because of the complicated machining required. More particularly, it is a common practice to cast a carrier roller according to a split-casing technique wherein a roller is split into two halves with respect to its center plane and thereafter the aforesaid two halves are welded together into a form of a roller. As a result, the provision of a cushion material or a resilient material on the under surface of a carrier roller leads to a complicated casting process. In other words, the engaging surface of a roller with a track link should be cast separately, and a cushion member should be bolted to a body of the roller, thus resulting in tremendously complicated machining and casting processes.

SUMMARY OF THE INVENTION

It is an object of the present invention to provide a noise reduction means for a carrier roller in a crawler tractor, which means includes guard members adapted to absorb metallic sounds produced from the engaging surface of a carrier roller with a track link, and to suppress vibrations of the roller itself.

It is another object of the present invention to provide a noise reduction means for a carrier roller in a crawler tractor, which means includes another guard member having a vibration-suppressing or damping material and noise-absorbing material which are buried in an annular groove defined in the central portion of a periphery of a carrier roller.

It is still another object of the present invention to provide a noise reduction means for a carrier roller of the type described, which means provides noise-absorbing guard members of a less expensive and simple construction, thereby necessitating no change in the fundamental construction of a cast carrier roller.

According to the present invention, there is provided a noise reduction apparatus for a carrier roller in a crawler tractor, which apparatus includes first and second dished, annular guard members including steel plates and noise-absorbing members bonded thereto, and a third annular guard member having a noise-absorbing member and a vibration damping material in the form of a layer. The first and second guard members are removably secured to the opposite side faces of the carrier roller, while the third guard member is closely fitted, through the medium of a layer of the aforesaid vibration damping material, into an annular groove defined along the central portion of a periphery of the carrier roller. The noise-absorbing members of the first and second guard members are positioned on the respective inner surfaces of the steel plate members, when the first and second guard members are secured to the carrier roller.

BRIEF DESCRIPTION OF THE DRAWINGS

FIG. 1 is an elevational view of a carrier roller according to the present invention; and FIG. 2 is a cross-sectional view taken along the line II—II of FIG. 1.

DESCRIPTION OF THE PREFERRED EMBODIMENTS

A carrier roller produces metallic sounds, when track links 40 of a track chain hit on a carrier roller during travel of a tractor.

The front elevational view of a carrier roller according to the present invention is shown in FIG. 1. Shown at 1 is a body of a carrier roller, at 20A, 20B are halves of a first guard member 20, at 24 a noise-absorbing material, at 30A, 30B are halves of a second guard member 30, at 36 a bolt and at 38 a central opening or hollow in the carrier roller.

Referring to FIG. 2, shown at 6 is an annular groove defined along the central portion of a periphery of a carrier roller. The annular groove 6 has a cross section as shown, while the wall of the aforesaid groove 8 is lined with a vibration suppressing or damping material 8 in the form of a layer, being bonded to the wall of the annular groove 6. The damping material is made of an elastomer, such as for instance, vinyl copolymer (Trade name HAMA-DAMPER) and is also of an annular form. A third annular guard member 10 of a ring-shape is fitted into an annular groove 9 defined by the aforesaid damping material, the member 10 being bonded to the top surface of the damping material 8. In this respect, the third guard member 10 consists of a surface layer of a porous laminated vinyl layer, an intermediate layer of a urethane foam and of a lesser thickness, and a core portion of laminated glass fibers. The aforesaid surface layer, intermediate layer and core portion are bonded together. Defined between the periphery of the third guard member and the inner surface of a track bushing 50 of a track chain is a clearance H, which is maintained constant during the travel of a tractor. As a result, the periphery of the member 10 will not contact the inner surface of the bushing 50 assuring an extended service life. The third guard member 10 absorbs metallic sounds produced when the track links 40 hit on the surfaces of the carrier roller, while the damping material 8 suppresses the vibration of the carrier roller itself.

First and second guard members 20, 30, respectively, are secured to the opposite end faces 3, 5 of the carrier roller 1 by means of bolts. The first and second guard members 20, 30 are dimpled so as to give a dish shape, and include annular steel plates 21, 31 and noise-absorbing materials 24, 34 bonded thereto. The peripheral edge portions of the first and second guard members 20, 30 are directed outwardly of the body 1 of the carrier roller, when secured to the opposite side faces 3, 5 thereof, with the noise-absorbing materials 24, 34 positioned inwardly of the steel plates. For avoiding duplicate description, the first guard member 20 alone will be described in more detail. Defined in the central portions of the steel plate 21 and noise-absorbing member 24 is a common through-hole or opening 28, while bolt holes 27 are provided therein for receiving bolts 26 therein. The first guard member 20 is secured to the body of a carrier roller by means of bolts 26, while a shaft not shown is inserted through the opening 28. An outer circular edge 22 of the steel plate 21 is bent inwardly, thereby serving as a seat for the noise-absorbing member 24. The noise-absorbing member 24 is bonded to the inner surface of the steel plate 21. The noise-absorbing member 24 should preferably be made of the same material as that of the third noise-absorbing guard member 10, or laminated plates of porous vinyl chloride and a urethane foam.

The dimpled or dished shape of the first guard member 20 is adapted to shielding and absorbing metallic sounds of the track links 40 hitting on the surface 12 of the body 1. The metallic sounds produced on the surface 12 of the body have a definite orientation and are of a high frequency. An angle of the peripheral edge portion of the first guard member 21 is determined, taking these into consideration.

The same description as above may be applied to the second guard member 30. However, a diameter of the second guard member 30 is somewhat smaller than that of the first guard member 20, so as to avoid interference with an attaching bracket (not shown) for the carrier roller.

As shown in FIG. 1, it is recommendable that bolts 26 and 36, four in number for each, be provided for the first and second guard members 20 and 30, respectively.

It is further recommendable that the first and second guard members 20 and 30 be of a split type, and thus the first and second guard members 20, and 30 are split into two halves 20A, 20B and 30A, 30B, respectively. This aids in ready replacement and assembly of the members.

As is apparent from the foregoing description of the noise reduction means according to the present invention, the third guard member made of a noise-absorbing material is simply buried through the medium of a layer of a damping material in an annular groove provided in the central portion of a periphery of the carrier roller, while the first and second guard members are removably secured to the opposite side faces of the roller in a simple manner.

As a result, high-frequency metallic sounds of a track link hitting on a carrier roller, which sounds are directed inwardly of the roller, may be absorbed and shielded by the third guard member and the damping material, while the high-frequency metallic sounds which are directed outwardly of the roller may be absorbed and shielded by the first and second guard members. Thus, the noise reduction means according to the present invention may effectively reduce the level of noises produced from the engaging surfaces of a carrier roller with a track link.

What is claimed is:

1. A noise reduction apparatus for a carrier roller in a crawler tractor, the carrier roller being of the type having a body with opposite side faces formed thereon, comprising:

first and second dished annular guard members secured to the opposite side faces of the body, respectively, said guard members each including an annular steel plate and an annular noise-absorbing member, the latter of which is positioned inwardly of each plate when said first and second guard members are secured to the body;

means forming an annular groove in the central portion of the periphery surface of the body;

a vibration damping material in the form of a layer, said material being bonded to the wall of the annular groove and forming an annular groove therein; and a third guard member made of a noise-absorbing material, and closely fitted in the annular groove defined in the layer of said damping material.

2. A noise reduction apparatus as set forth in claim 1, wherein said third guard member maintains a given clearance from the inner surface of a track bushing of a track chain.

3. A noise reduction apparatus as set forth in claim 1, wherein the outer peripheral edges of said first and second dished annular guard members are bent outwardly of said carrier roller, as viewed when said first and second guard members are secured to said carrier roller.

4. A noise reduction apparatus as set forth in claim 1, wherein said first and second guard members are removably secured to said opposite side faces of said carrier roller by means of fastening means.

5. A noise reduction apparatus as set forth in claim 1, wherein said first and second guard members may be split into two halves with respect to the center line thereof, respectively.

* * * * *